2,983,575
PREPARATION OF BOROHYDRIDES

Murray S. Cohen, Dover, and John E. Paustian, Morristown, N.J., assignors, by mesne assignments, to Thiokol Chemical Corporation, a corporation of Delaware No Drawing. Filed Oct. 1, 1956, Ser. No. 613,355

3 Claims. (Cl. 23—14)

Our invention relates to a method for the production of borohydrides.

The pyrolysis of diborane to form higher boron hydrides is well known. The operation involves the heating of diborane under controlled conditions, and results in the production of tetraborane, pentaborone-9, pentaborane-11, decaborane and so forth. Note, for example, the article by McCarty and Di Giorgio appearing on pages 3138 to 3143 of the July 1951 issue of the Journal of the American Chemical Society. Frequently, in the pyrolysis operation an inert yellow solid is formed in addition to the aforementioned boron hydrides. This solid is a mixture of polymerized higher boron hydrides higher than decaborane. It is in general chemically inert and resists efforts to convert it into readily usable chemical compounds. Sometimes, over 50 percent of the end product of the diborane pyrolysis consists of yellow solids. The boron lost in this unusable byproduct adds greatly to the cost of the pyrolysis operation and, of course, lowers the yield of the desired boron hydrides, chiefly pentaborane-9 and decaborane. The yellow solids, in addition to representing a loss, also present a disposal problem inasmuch as they are hazardous to handle.

In accordance with our invention, we have devised a method whereby yellow solids produced in the thermal pyrolysis of diborane can be conveniently converted into materials which possess a high order of utility, namely, borohydrides. This is accomplished by reacting the yellow solids formed by the thermal pyrolysis of diborane and a strong base while the reactants are in admixture with water or a lower saturated monohydric aliphatic alcohol or a mixture thereof. Among the strong bases which can be employed in our process are the alkali metal hydroxides, the alkaline earth metal hydroxides and tetra-lower alkylammonium hydroxides, for example, sodium hydroxide, potassium hydroxide, lithium hydroxide, calcium hydroxide, magnesium hydroxide, tetramethylammonium hydroxide. The temperature utilized can be varied widely. However, as the speed of the reaction is slow at very low temperatures and decomposition occurs at high temperatures, it is preferable to maintain the reaction temperature within the range from about 0° C. to 60° C. Likewise, the concentration of the strong base in admixture with the water or alcohol can also be varied widely. Where the strong base is an alkali metal hydroxide, the concentration of the strong base will preferably be within the range from about 10 weight percent to about 35 weight percent, based upon the weight of the strong base and the water or alcohol.

After the reaction resulting in the formation of the borohydride has taken place, remaining solids can be separated, as by centrifuging or decantation. The water or alcohol can then be removed from the liquid portion by evaporation under a vacuum. Solids remaining after the evaporation can then be extracted with a suitable solvent, such as liquid ammonia or a lower trialkylammonium such as trimethylamine or triethylamine, and the solution of the borohydride thus formed heated to remove the solvent and leave the borohydride product as a residue. Where it is desired to produce a borohydride product of high purity, this procedure involving extraction with ammonia or an amine followed by removal of the amine or ammonia from the solution thus produced can be repeated several times.

The following examples illustrate various embodiments which fall within the broad scope of our invention. The yellow solids employed as a reactant in the examples were produced in the pyrolysis of diborane in a hot tube while in admixture with hydrogen gas as a diluent. The pyrolysis took place at 50 p.s.i.g. and at a temperature within the range from 200° C. to 290° C. The yellow solids employed in the examples contain hydrocarbon impurity. A hydrocarbon solvent was employed in separating the yellow solids from the decaborane also produced in the pyrolysis of the diborane, and a certain amount remained associated with the yellow solids as an impurity.

Example I

A 10 gram sample of yellow solids (containing 15–17 weight percent hydrocarbon) was added to 200 ml. of a 10 weight percent aqueous solution of potassium hydroxide over a period of one hour while the temperature was maintained at from 0° C. to 5° C. After the addition of the yellow solids had been completed, the reaction mixture was heated at 45° C. for 5 minutes, and then the reaction mixture was centrifuged to remove remaining solids. Water was removed from the clear solution thus produced by vacuum evaporation, and then the resulting solids were extracted with 200 ml. of liquid ammonia. Following this the ammonia was evaporated from the solution to leave remaining 1.5 grams of product containing 70–75 weight percent of potassium borohydride.

Example II

A sample of yellow solids weighing 9.0 grams (containing 15–17 weight percent hydrocarbon) was added to 100 ml. of 30 weight percent aqueous potassium hydroxide over a period of one hour while the temperature was maintained at from 0° C. to 5° C. After the addition of the yellow solids had been completed, the reaction mixture was heated at 45° C. for 5 minutes, and then the reaction mixture was centrifuged to remove remaining solids. Water was removed from the clear solution thus produced by vacuum evaporation, and then the resulting solids were extracted with 200 ml. of liquid ammonia. Following this, the ammonia was evaporated from the solution to leave remaining 2.5 grams of product containing 70–75 weight percent of potassium borohydride.

Example III

A 7 gram sample of yellow solids (containing 4 weight percent hydrocarbon) was added to 100 ml. of a 29 weight percent methanolic solution of potassium hydroxide over a period of one hour while the temperature was maintained at from 0° C. to 5° C. After the addition of the yellow solids had been completed, the reaction mixture was heated at 45° C. for 5 minutes, and then the reaction mixture was centrifuged to remove remaining, solids. Methanol was removed from the clear solution thus produced by vacuum evaporation, and the resulting solids were extracted with 200 ml. of liquid ammonia. Following this, the ammonia was evaporated from the solution to leave remaining 1.9 grams of product containing 60–65 weight percent of potassium hydroxide.

Example IV

A 4 gram sample of yellow solids (containing 4 percent hydrocarbon) was added to 100 ml. of a 28 weight percent aqueous solution of potassium hydroxide over a period of ½ hour while the temperature was maintained between 5° C. and 10° C. After the addition of the yellow solids had been completed, the reaction mixture was heated at 45° C. for 5 minutes, and then the reaction mixture was centrifuged to remove remaining solids. Water was removed from the clear solution thus produced by vacuum evaporation, and then the resulting solids were extracted with 200 ml. of liquid ammonia. Following this, the ammonia was evaporated from the solution to leave remaining 1.3 grams of product containing 70-75 weight percent of potassium borohydride.

*Example V*

A 10 gram sample of yellow solids (containing 15-17 weight percent hydrocarbon) was added to 100 ml. of a 10 weight percent aqueous solution of tetramethylammonium hydroxide over a period of one hour while the temperature was maintained at from 0° C. to 5° C. After the addition of yellow solids had been completed, the reaction mixture was heated at 45° C. for 5 minutes, then the reaction mixture was centrifuged to remove remaining solids. Water was removed from the clear solution thus produced by vacuum evaporation, and then the resulting solids were extracted with 200 ml. of liquid ammonia. Following this, the ammonia was evaporated from the solution to leave remaining 0.6 gram of material.

*Example VI*

A 0.7 gram sample of yellow solids (containing 4 weight percent hydrocarbon) was added to 100 ml. of a 43.5 weight percent aqueous solution of sodium hydroxide over a period of one hour while the temperature was maintained at from 0° C. to 5° C. After the addition of yellow solids had been completed, the reaction mixture was heated at 45° C. for 5 minutes, and then the reaction mixture was centrifuged to remove remaining solids. Water was removed from the clear solution thus produced by vacuum evaporation.

We claim:
1. A method for the preparation of potassium borohydride which comprises reacting yellow solids formed by the thermal pyrolysis of diborane with potassium hydroxide at a temperature within the range from about 0° C. to about 60° C. while the reactants are in admixture with at least one material selected from the group consisting of water and lower alkanols, and recovering potassium borohydride from the reaction mixture.
2. The method of claim 1 wherein said material is water.
3. The method of claim 1 wherein said material is methanol.

References Cited in the file of this patent

Jensen: "A Study on Sodium Borohydride," page 31, Nyt Nordisk Forlag, Arnold Busch, Copenhagen (1954).

Stock: "Hydrides of Boron and Silicon," pages 87-90, 147, 148 (1933), Cornell University Press, Ithaca, N.Y.

Stone: "Quarterly Reviews (London)," vol. 9, No. 2, page 199 (1955).